(12) United States Patent
Kusase et al.

(10) Patent No.: US 7,602,095 B2
(45) Date of Patent: Oct. 13, 2009

(54) AUTOMOTIVE TANDEM ALTERNATOR HAVING REDUCED AXIAL LENGTH AND CAPABLE OF EFFECTIVELY SUPPRESSING MAGNETIC LEAKAGE

(75) Inventors: Shin Kusase, Oobu (JP); Takeo Maekawa, Okazaki (JP); Akiya Shichijoh, Ama-gun (JP)

(73) Assignee: Denso Corporation, Kariya (JP)

( * ) Notice: Subject to any disclaimer, the term of this patent is extended or adjusted under 35 U.S.C. 154(b) by 88 days.

(21) Appl. No.: 11/730,900

(22) Filed: Apr. 4, 2007

(65) Prior Publication Data
US 2007/0241633 A1 Oct. 18, 2007

(30) Foreign Application Priority Data
Apr. 13, 2006 (JP) .............................. 2006-110985

(51) Int. Cl.
*H02K 16/02* (2006.01)
*H02K 1/06* (2006.01)
(52) U.S. Cl. ....................... 310/263; 310/114
(58) Field of Classification Search ................. 310/112, 310/114, 263, 258–259
See application file for complete search history.

(56) References Cited
U.S. PATENT DOCUMENTS

| | | | | | |
|---|---|---|---|---|---|
| 829,015 | A | * | 8/1906 | Johnson | 310/263 |
| 4,227,109 | A | * | 10/1980 | Mulach | 310/258 |
| 4,494,030 | A | * | 1/1985 | Mulach et al. | 310/256 |
| 4,980,595 | A | * | 12/1990 | Arora | 310/263 |
| 5,130,595 | A | * | 7/1992 | Arora | 310/268 |
| 5,177,388 | A | * | 1/1993 | Hotta et al. | 310/114 |
| 5,177,391 | A | * | 1/1993 | Kusase | 310/263 |
| 5,270,604 | A | * | 12/1993 | Sandel et al. | 310/263 |
| 6,337,530 | B1 | * | 1/2002 | Nakamura et al. | 310/258 |
| 6,437,477 | B1 | * | 8/2002 | Krefta et al. | 310/263 |
| 6,563,244 | B1 | * | 5/2003 | Yamauchi et al. | 310/90.5 |

FOREIGN PATENT DOCUMENTS

| | | |
|---|---|---|
| JP | U 57-42565 | 3/1982 |
| JP | A 5-308751 | 11/1993 |
| JP | A 11-98789 | 4/1999 |

* cited by examiner

*Primary Examiner*—Tran N Nguyen
(74) *Attorney, Agent, or Firm*—Oliff & Berridge, PLC

(57) ABSTRACT

According to the invention, a tandem alternator includes a rotary shaft, a first and a second field arranged in tandem on the rotary shaft, and a first and a second armature arranged in tandem in the axial direction of the rotary shaft. The first armature is provided on an outer periphery of the first field to constitute a first power generation unit. The second armature is provided on an outer periphery of the second field to constitute a second power generation unit. The first and second fields are arranged to abut each other in the axial direction of the rotary shaft, so as to minimize the axial length of the alternator. The first and second fields are configured to respectively create a first and a second magnetomotive force whose directions are opposite to each other, so as to minimize magnetic leakage between the first and second power generation units.

7 Claims, 5 Drawing Sheets

FRONT SIDE ← → REAR SIDE

AUTOMOTIVE TANDEM ALTERNATOR HAVING REDUCED AXIAL LENGTH AND CAPABLE OF EFFECTIVELY SUPPRESSING MAGNETIC LEAKAGE

CROSS-REFERENCE TO RELATED APPLICATION

This application is based on and claims priority from Japanese Patent Application No. 2006-110985, filed on Apr. 13, 2006, the content of which is hereby incorporated by reference into this application.

BACKGROUND OF THE INVENTION

1. Technical Field of the Invention

The present invention relates generally to electric generators. More particularly, the invention relates to a tandem alternator for a vehicle, which has a reduced length in the axial direction of a rotary shaft thereof and can effectively suppress magnetic leakage between power generation units arranged in tandem in the axial direction.

2. Description of the Related Art

A conventional tandem alternator 500 for a vehicle includes, as shown in FIG. 6, a single rotary shaft 501 and two power generation units 502 and 503 that are arranged in tandem in the axial direction of the rotary shaft 501.

The power generation unit 502 includes a field 502A and an armature 502B, and the power generation unit 503 includes a field 503A and an armature 503B. The fields 502A and 503A of the power generation units 502 and 503 are arranged in tandem on the rotary shaft 501; the armatures 502B and 503B are arranged in tandem in the axial direction of the rotary shaft 501 and surround the fields 502A and 503A, respectively.

With the above tandem arrangement, it is possible to make the alternator 500 compact while enabling the alternator 500 to produce two different voltages. That is to say, compared to a scheme of employing two alternators producing different voltages, both the manufacturing cost and the installation space can be significantly reduced. In addition, it is preferable for the tandem alternator 500 to produce a typical voltage of 12V and a higher voltage of 42V to meet different voltage requirements of electrical loads provided on the vehicle.

However, with the above tandem arrangement, the axial length of the alternator 500 (i.e., the length of the alternator 500 in the axial direction of the rotary shaft 501) becomes more than 1.5 times that of a typical alternator that includes only a single power generation unit. Thus, in installation of the tandem alternator 500 to an engine of the vehicle, it is difficult to suitably arrange the alternator 500 without causing interference between the alternator 500 and an intake or exhaust pipe of the engine.

Accordingly, it is desired to reduce the axial length of the tandem alternator 500. However, when the power generation units 502 and 503 are arranged close to each other in the axial direction of the rotary shaft 501 for the purpose of reducing the axial length of the alternator 500, magnetic leakage may occur between the power generation units 502 and 503.

More specifically, the tandem alternator 500 includes a front housing 504, a rear housing 505, and a plurality of bolts 506. The front and rear housings 504 and 505 are arranged in the axial direction of the rotary shaft 501 with the armatures 502B and 503B intervening therebetween. Each of the bolts 506 extends in the axial direction of the rotary shaft 501 to tightly connect the front and rear housings 504 and 505, thereby securely retaining the armatures 502B and 503B between the front and rear housings 504 and 505. Further, in terms of cost and tensile strength, it is desirable to use a magnetic material to make the bolts 506. However, when the bolts 506 are made of a magnetic material, magnetic leakage (i.e., leakage of magnetic flux) may occur between the power generation units 502 and 503 through the bolts 506. Consequently, it may become difficult to accurately and separately control the power generation units 502 and 503; in addition, the bolts 506 may be loosened by heat induced therein due to the leakage flux passing therethrough.

One approach to the above problems is to space the fields 502A and 502B of the power generation units 502 and 503 in the axial direction of the rotary shaft 501, as shown in FIG. 6, thereby preventing formation of a closed magnetic path that is composed of the filed 502A, the armature 502B, the bolts 506, the armature 503B, and the field 503B. As a consequence, the magnetic leakage between the two power generation units 502 and 503 can be suppressed. (Such an approach is disclosed, for example, in Japanese Utility Model First Publication S57-42565.)

Japanese Patent First Publication No. H5-308751 discloses an automotive tandem alternator, in which the two fields are also spaced in the axial direction of the rotary shaft with a cooling fan interposed therebetween. In addition, the outer diameters of the armatures are made different from each other, so as to further reliably prevent formation of a closed magnetic path as described above.

Japanese Patent First Publication No. H11-98789 discloses an automotive tandem alternator, in which the front-side and rear-side armatures are respectively secured by a plurality of front-side bolts and a plurality of rear-side bolts. The front-side bolts are spaced from the rear-side bolts in the axial direction of the rotary shaft, so as to prevent formation of a closed magnetic path that is composed of the front-side field, the front-side armature, the front-side bolts, the rear-side bolts, the rear-side armature, and the rear-side field.

However, using any of the above approaches disclosed in the prior art, axial lengths of tandem alternators are increased, rather than reduced, thus making it difficult to install the tandem alternators in narrow engine compartments.

SUMMARY OF THE INVENTION

The present invention has been made in view of the above-mentioned problems.

It is, therefore, an object of the present invention to provide a tandem alternator which has a reduced length in the axial direction of a rotary shaft thereof and can effectively suppress magnetic leakage between power generation units arranged in tandem in the axial direction.

It is another object of the present invention to provide a tandem alternator which can effectively suppress magnetic leakage between power generation units that are arranged in tandem in the axial direction of a rotary shaft of the alternator, thereby reliably preventing bolts connecting front and rear housings of the alternator from being loosened by heat induced therein due to leakage flux passing therethrough.

According to a first aspect of the present invention, there is provided a tandem alternator which includes: a rotary shaft; a first and a second field which are arranged in tandem on the rotary shaft; and a first and a second armature which are arranged in tandem in an axial direction of the rotary shaft, the first armature being provided on an outer periphery of the first field to constitute, together with the first field, a first electric power generation unit, the second armature being provided on an outer periphery of the second field to constitute, together with the second field, a second electric power generation unit, wherein the first and second fields are arranged to abut each other in the axial direction of the rotary shaft, and the first and second fields are configured to respectively create a first and a second magnetomotive force whose directions are opposite to each other.

Since the first and second fields are arranged in abutment with each other in the axial direction of the rotary shaft, the length of the tandem alternator in the axial direction is reduced. Further, since the directions of the first and second magnetomotive forces created by the first and second fields are opposite to each other, magnetic leakage between the first and second electric power generation units can be effectively suppressed.

The tandem alternator may further include: a first and a second housing which are arranged in the axial direction of the rotary shaft with the first and second armatures intervening therebetween, the first and second housings rotatably supporting the rotary shaft; and a plurality of connecting members each of which extends in the axial direction of the rotary shaft to connect the first and second housings, thereby securing the first and second armatures between the first and second housings. Further, each of the connecting members is preferably made of a magnetic material.

The first armature may include a first cylindrical armature core and a first armature winding wound around the first armature core, and the second armature may include a second cylindrical armature core and a second armature winding wound around the second armature core. Each of the first and second armature cores preferably have formed on an outer surface thereof a plurality of recesses extending in the axial direction of the rotary shaft. Further, each of the connecting members is preferably partially received in a pair of the recesses that are formed respectively on the outer surfaces of the first and second armature cores and aligned in the axial direction of the rotary shaft.

Preferably, the tandem alternator further includes a ring which is made of a magnetic material and interposed between the first and second armatures in the axial direction of the rotary shaft.

Each of the connecting members may be a bolt.

The first field may include a first lundell-type field core mounted on the rotary shaft and a first field winding wound around the first field core, and the second field may include a second lundell-type field core mounted on the rotary shaft and a second field winding wound around the second field core.

Each of the first and second field cores may include a pair of inside and outside disc portions that are spaced in the axial direction of the rotary shaft with a corresponding one of the first and second field windings interposed therebetween. Further, the inside disc portions of the first and second field cores are preferably arranged to abut each other in the axial direction of the rotary shaft.

Preferably, the inside disc portions of the first and second field cores are magnetically connected to each other, and the sum of widths of the inside disc portions is less than the sum of widths of the outside disc portions of the first and second filed cores in the axial direction of the rotary shaft.

Preferably, the first and second field cores include the same number of claw portions extending axially outward from the respective inside disc portions; the claw portions of the first and second field cores are alternately arranged in a circumferential direction of the rotary shaft; a difference in electrical angle between any pair of the claw portions of the first and second field cores, which are adjacent to each other in the circumferential direction of the rotary shaft, is equal to 180 degrees.

The rotary shaft may be configured to be driven by an engine of an automobile.

According to a second aspect of the present invention, there is provided a tandem alternator which includes: a rotary shaft; a first and a second field which are arranged in tandem on the rotary shaft; a first and a second armature which are arranged in tandem in an axial direction of the rotary shaft, the first armature being provided on an outer periphery of the first field to constitute, together with the first field, a first electric power generation unit, the second armature being provided on an outer periphery of the second field to constitute, together with the second field, a second electric power generation unit; a first and a second housing which are arranged in the axial direction of the rotary shaft with the first and second armatures intervening therebetween, the first and second housings rotatably supporting the rotary shaft; and a plurality of connecting members each of which extends in the axial direction of the rotary shaft to connect the first and second housings, thereby securing the first and second armatures between the first and second housings, wherein each of the connecting members is made of a magnetic material, and the first and second fields are configured to respectively create a first and a second magnetomotive force whose directions are opposite to each other.

Since the connecting members are made of a magnetic material, the manufacturing cost is reduced and the tensile strength is secured. Further, since the directions of the first and second magnetomotive forces created by the first and second fields are opposite to each other, magnetic leakage between the first and second electric power generation units can be effectively suppressed. As a result, the connecting members can be reliably prevented from being loosened by heat induced therein due to leakage flux passing therethrough.

According to a third aspect of the present invention, there is provided a tandem alternator which includes: a rotary shaft; a first and a second field which are arranged in tandem on the rotary shaft, the first field including a first lundell-type field core mounted on the rotary shaft and a first field winding wound around the first field core, the second field including a second lundell-type field core mounted on the rotary shaft and a second field winding wound around the second field core, each of the first and second field cores including a pair of inside and outside disc portions that are spaced in the axial direction of the rotary shaft with a corresponding one of the first and second field windings interposed therebetween; and a first and a second armature which are arranged in tandem in an axial direction of the rotary shaft, the first armature being provided on an outer periphery of the first field to constitute, together with the first field, a first electric power generation unit, the second armature being provided on an outer periphery of the second field to constitute, together with the second field, a second electric power generation unit, wherein the inside disc portions of the first and second field cores are arranged to be magnetically connected to each other, the first and second fields are configured to respectively create a first and a second magnetomotive force whose directions are opposite to each other, and the sum of widths of the inside disc portions is less than the sum of widths of the outside disc portions of the first and second field cores in the axial direction of the rotary shaft.

As above, in the tandem alternator according to third aspect, the inside disc portions of the first and second field cores are arranged to be magnetically connected to each other, thereby forming a common magnetic path to the first and second electric power generation units. Further, the widths of the inside disc portions are reduced so that the sum of widths of the inside disc portions is less than that of the outside disc portions in the axial direction of the rotary shaft. As a result, the length of the tandem alternator in the axial direction is reduced. Furthermore, since the directions of the first and second magnetomotive forces created by the first and second fields are opposite to each other, magnetic leakage between the first and second electric power generation units can be effectively suppressed.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

Figure 1:
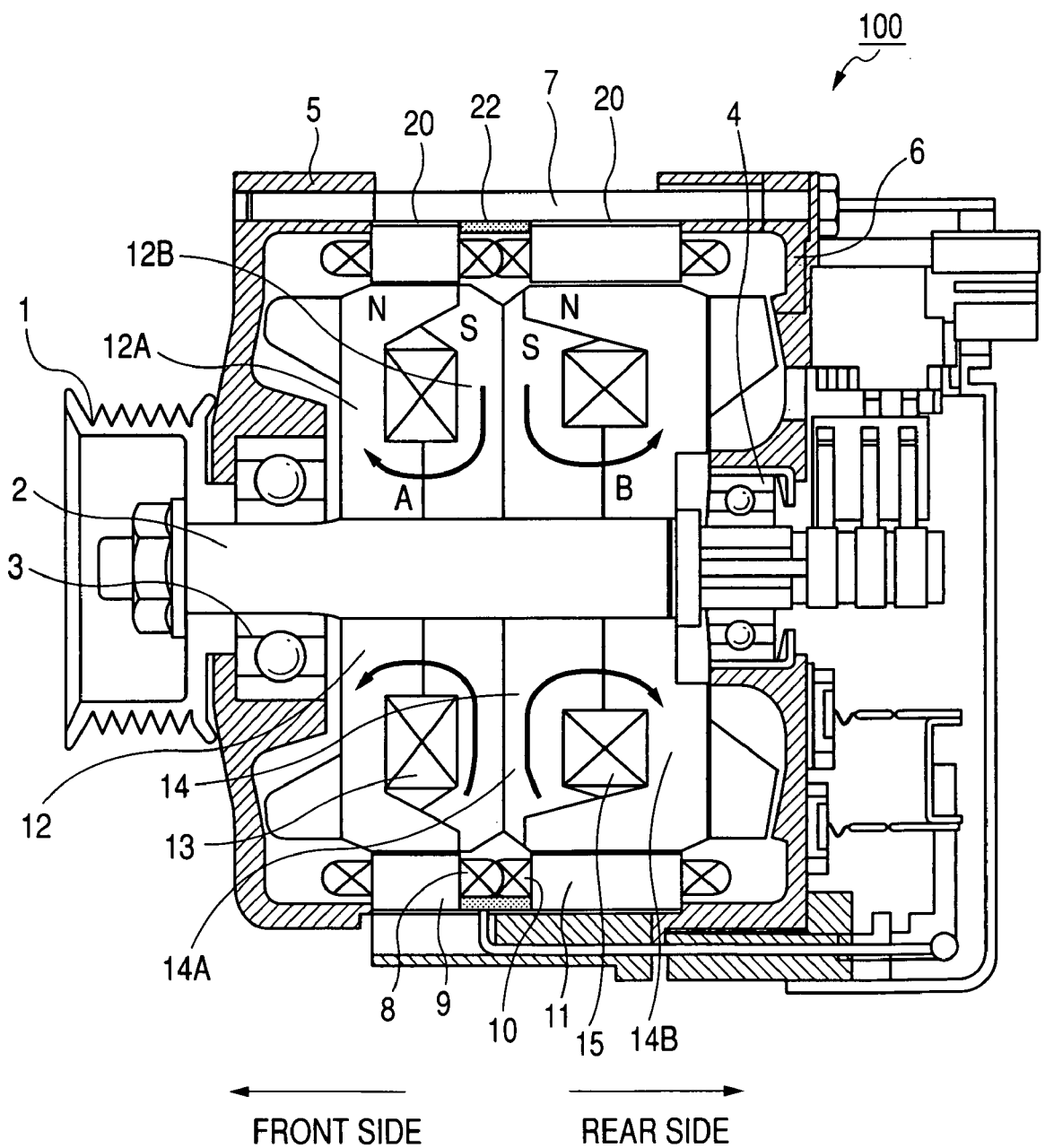
FIG. 1 is a partially cross-sectional side view showing the overall configuration of a tandem alternator according to the first embodiment of the invention.

The preferred embodiments of the present invention will be described hereinafter with reference to FIGS. 1-5.

It should be noted that, for the sake of clarity and understanding, identical components having identical functions in different embodiments of the invention have been marked, where possible, with the same reference numerals in each of the figures.

First Embodiment

FIG. 1 shows the overall configuration of a tandem alternator 100 according to the first embodiment of the invention.

The alternator 100 is designed for use in an automobile. More specifically, the alternator 100 is configured to be driven by an engine (not shown) of the automobile via a pulley 1 that is fitted on a rotary shaft 2 of the alternator 100.

The rotary shaft 2 is rotatably supported by a front bearing 3 and a rear bearing 4, which are respectively provided in a front housing 5 and a rear housing 6 of the alternator 100. In other words, the front and rear housings 5 and 6 together rotatably support the rotary shaft 2 via the front and rear bearings 3 and 4. In the present embodiment, both the front and rear housings 5 and 6 are made of a nonmagnetic material.

A plurality of bolts 7 are provided to tightly connect the front and rear housings 5 and 6 together. More specifically, as shown in FIG. 1, each of the bolts 7 extends in the axial direction of the rotary shaft 2 to engage both the front and rear housings 5 and 6, thereby securely retaining a first and a second armature of the alternator 100 between the housings 5 and 6.

The first armature of the alternator 100 includes an armature winding 8 and a laminated armature core 9 around which the armature winding 8 is wound. Similarly, the second armature of the alternator 100 includes an armature winding 10 and a laminated armature core 11 around which the armature winding 10 is wound. As shown in FIG. 1, the first and second armatures are arranged in tandem in the axial direction of the rotary shaft 2 with a ring 22 interposed therebetween.

The alternator 100 further includes a first and a second field that arranged in tandem on the rotary shaft 2. More specifically, the first field includes a lundell-type field core 12 fitted on the rotary shaft 2 and a field winding 13 wound around the field core 12. The first field is surrounded by the first armature, so as to constitute a first power generation unit of the alternator 100 together with the first armature. Similarly, the second field includes a lundell-type field core 14 fitted on the rotary shaft 2 and a field winding 15 wound around the field core 14. The second field is surrounded by the second armature, so as to constitute a second power generation unit of the alternator 100 together with the second armature. In addition, in the present embodiment, the outer diameter of the armature core 9 is almost equal to that of the armature core 11; the outer diameter of the field core 12 is almost equal to that of the field core 14.

The field windings 13 and 15 are configured to be respectively supplied with a first and a second field current through a slip ring-brush mechanism the description of which is omitted hereinafter. The alternator 100 further includes a first and a second rectifier (not shown), through which AC power outputs from the first and second power generation units are respectively rectified into DC powers.

The lundell-type field core 12 of the first field includes a pair of axially inside and outside core pieces. Each of the inside and outside core pieces includes a cylindrical boss portion fitted on the rotary shaft 2, a disc portion radially extending from the boss portion, and a plurality of claw portions axially extending from the disc portion. The disc portions of the outside and inside core pieces are respectively referred to as outside disc portion 12A and inside disc portion 12B hereinafter. As shown in FIG. 1, the field winding 13 of the first field is interposed between the outside and inside disc portions 12A and 12B in the axial direction of the rotary shaft 2.

Similarly, the lundell-type field core 14 of the second field also includes a pair of axially inside and outside core pieces. Each of the inside and outside core pieces of the field core 14 also includes a cylindrical boss portion fitted on the rotary shaft 2, a disc portion radially extending from the boss portion, and a plurality of claw portions axially extending from the disc portion. The disc portions of the inside and outside core pieces of the field core 14 are respectively referred to as inside disc portion 14A and outside disc portion 14B hereinafter. As shown in FIG. 1, the field winding 15 of the second field is interposed between the inside and outside disc portions 14A and 14B in the axial direction of the rotary shaft 2.

In the present embodiment, the first and second fields are arranged to abut each other in the axial direction of the rotary shaft 2, so as to minimize the axial length of the alternator 100. More specifically, in the present embodiment, the rear end face of the inside disc portion 12B of the field core 12 is in intimate contact with the front end face of the inside disc portion 14A of the field core 14.

Further, in the present embodiment, the first and second fields are configured to respectively create a first and a second magnetomotive force whose directions are opposite to each other, so as to minimize magnetic leakage between the first and second power generation units.

More specifically, in the present embodiment, the field winding 13 is configured to create, upon being supplied with the first field current, the first magnetomotive force which induces a first magnetic flux A in the field core 12. On the other hand, the field winding 15 is configured to create, upon being supplied with the second field current, the second magnetomotive force which induces a second magnetic flux B in the field core 14. The first and second magnetic fluxes A and B are opposite to each other in the axial direction of the rotary shaft 2, as shown in FIG. 1.

In addition, to create the first and second magnetomotive forces in opposite directions, the first and second field currents are supplied to flow in the same circumferential direction with the first and second filed windings 13 and 15 wound in opposite circumferential directions. Alternatively, the first and second field currents may be supplied to flow in opposite circumferential directions with the first and second filed windings 13 and 15 wound in the same direction.

In the present embodiment, the bolts 7 connecting the front and rear housings 5 and 6 are made of a magnetic material, such as mild steel, so as to reduce the manufacturing cost while securing the tensile strength. However, as described previously, magnetic leakage may occur between the first and second power generation units through the bolts 7.

When such a magnetic leakage occurs, the leakage flux passing through the bolts 7 will fluctuate during rotation of the rotary shaft 2, since the bolts 7 are spaced in the circumferential direction (i.e., the rotational direction) of the rotary shaft 2 at predetermined intervals. The fluctuation in leakage flux will induce heat in the bolts 7, thereby increasing the energy loss and loosening the bolts 7. In addition, the leakage flux originating from the field of one of the first and second power generation units will cause a fluctuation in current induced in the armature of the other power generation units. As a result, it will become difficult to accurately and separately control the first and second power generation units.

However, with the configuration of the first and second fields according to the present embodiment, magnetic leakage between the first and second power generation units can be effectively suppressed.

More specifically, there are four different flows of leakage flux that may occur in the alternator 100. The first flow is induced by the first magnetomotive force, which is created by the field winding 13 of the first power generation unit, and passes along a first magnetic path that is composed of the outside disc portion 12A of the field core 12, the armature core 9, the bolts 7, the armature core 11, and the outside disc portion 14B of the field core 14. The second flow is also created by the first magnetomotive force and passes along a second magnetic path that is composed of the outside disc portion 12A, the armature core 9, the bolts 7, the armature core 11, and the inside disc portion 14A of the field core 14. The third flow is induced by the second magnetomotive force, which is created by the field winding 15 of the second power generation unit, and passes along a third magnetic path that is composed of the outside disc portion 14B, the armature core 11, the bolts 7, the armature core 9, and the outside disc portion 12A of the field core 12. The fourth flow is also induced by the second magnetomotive force and passes along a fourth magnetic path that is composed of the outside disc portion 14B, the armature core 11, the bolts 7, the armature core 9, and the inside disc portion 12B of the field core 12.

It can be seen that among the above four flows, the first and third flows pass along the same magnetic path in opposite directions. Therefore, when the magnitudes of the first and second magnetomotive forces are almost equal, the first and third flows are vanishingly small. Further, the second flow enters the armature core 11 from the bolts 7, diverges inside the armature core 11 in the circumferential direction, and enters the inside disc portion 14A of the field core 14 via the claw portions that extend from the disc portion 14A. Therefore, the magnetic resistance along the second magnetic path is very large, and the second flow is accordingly very small. Similarly, the fourth flow enters the armature core 9 from the bolts 7, diverges inside the armature core 9 in the circumferential direction, and enters the inside disc portion 12B of the field core 12 via the claw portions that extend from the disc portion 12B. Therefore, the magnetic resistance along the third magnetic path is also very large, and the fourth flow is also very small.

Accordingly, in the present embodiment, though the inside disc portions 12B and 14A of the field cores 12 and 14 abut each other in the axial direction of the rotary shaft 2, it is still possible to effectively suppress magnetic leakage between the first and second power generation units.

Consequently, it becomes possible to minimize the axial length of the alternator 100 while ensuring an accurate and separate control of the first and second power generation units.

Furthermore, with the configuration of the first and second fields according to the present embodiment, the bolts 7 are reliably prevented from being loosened by heat induced therein due to leakage flux passing therethrough.

Figure 2:
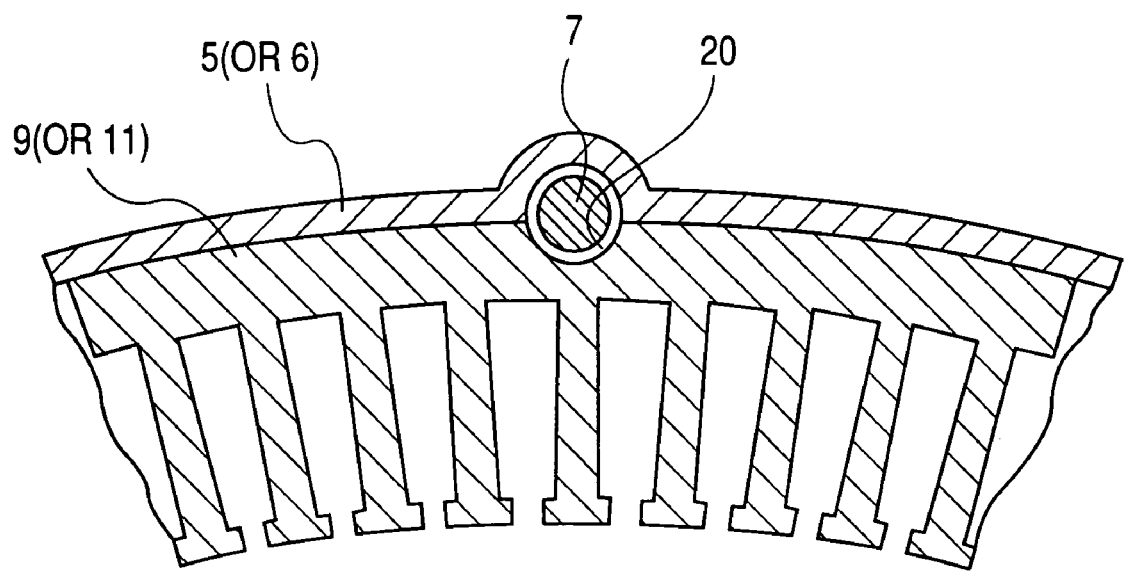
FIG. 2 is a partially cross-sectional view illustrating formation of recesses on outer surfaces of armature cores in the tandem alternator of FIG. 1.

Referring now to FIG. 2, in the present embodiment, each of the armature cores 9 and 11 has formed on the outer surface thereof a plurality of recesses 20. Each of the recesses 20 extends in the axial direction of the rotary shaft 2, has a semi-circular cross section perpendicular to the axial direction, and is aligned with one of the bolts 7 in the axial direction. Further, about a half of each of the bolts 7 is received in a pair of the recesses 20 that are formed respectively on the outer surfaces of the armature cores 9 and 11 and aligned in the axial direction of the rotary shaft 2.

With the above arrangement, the outer diameter of the alternator 100 is reduced by almost the diameter of stem portions of the bolts 7. Further, though the bolts 7 are in intimate contact with the armature cores 9 and 11, magnetic leakage between the armature cores 9 and 11 through the bolts 7 can still be effectively suppressed by virtue of the configuration of the first and second fields according to the present embodiment.

Referring back to FIG. 1, in the present embodiment, there is provided the ring 22 between the armature cores 9 and 11, as described perilously. The ring 22 functions as a spacer to keep a predetermined axial space between the armature cores 9 and 11. In other senses, the ring 22 corresponds to a center housing that is used in a conventional automotive tandem alternator. The center housing is generally made of a nonmagnetic material, such as aluminum, so as to suppress magnetic leakage between power generation units. In comparison, in the present embodiment, the ring 22 is made of a magnetic material, such as mild steel.

By interposing the ring 22 between the armature cores 9 and 11, it is possible to reduce leakage flux that passes through the bolts 7. More specifically, when there is a large difference in magnitude between the first and second magnetomotive forces and thus considerable magnetic leakage occurs between the first and second power generation units, most of the leakage flux passes through the ring 22, rather than through the bolts 7. This is because the cross-sectional area of the ring 22 perpendicular to the axial direction of the rotary shaft 2 is much larger than those of the bolts 7.

Consequently, heat induced in the bolts 7 due to leakage flux passing therethrough can be remarkably reduced, thereby reliably preventing the bolts 7 from being loosened by the heat.

Second Embodiment

This embodiment illustrates an automotive tandem alternator 200 which has a structure almost identical to that of the alternator 100 according to the previous embodiment. Accordingly, only the differences therebetween will be described hereinafter.

Referring again to FIG. 1, in the alternator 100, the axial widths (i.e., the widths in the axial direction of the rotary shaft 2) of the outside and inside disc portions 12A and 12B of the field core 12 are equal to each other, and the axial widths of the inside and outside disc portions 14A and 14B of the field core 14 are also equal to each other. Accordingly, the sum of axial widths of the inside disc portions 12B and 14A are equal to that of the outside disc portions 12A and 14B.

Figure 3:
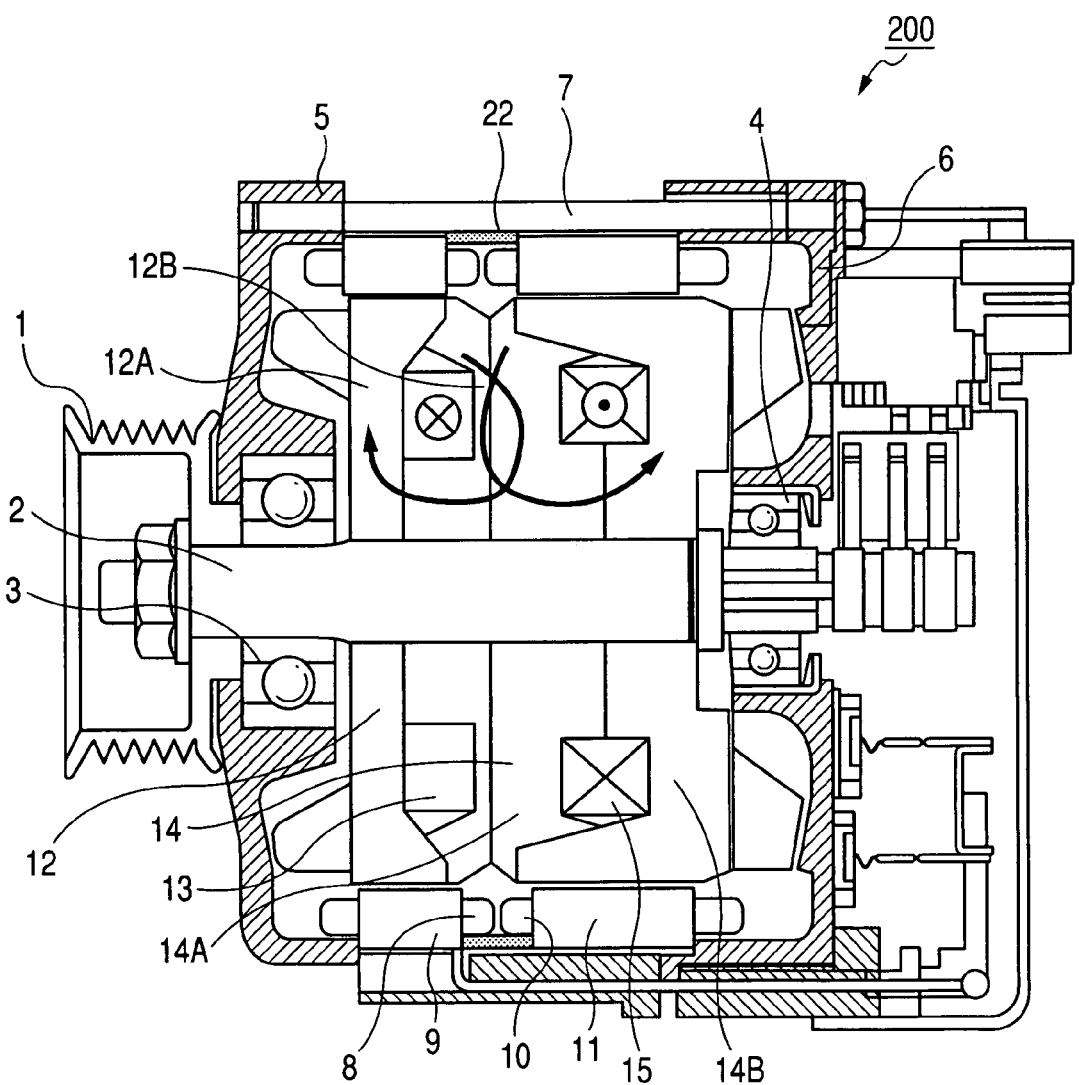
FIG. 3 is a partially cross-sectional side view showing the overall configuration of a tandem alternator according to the second embodiment of the invention.
Figure 4:
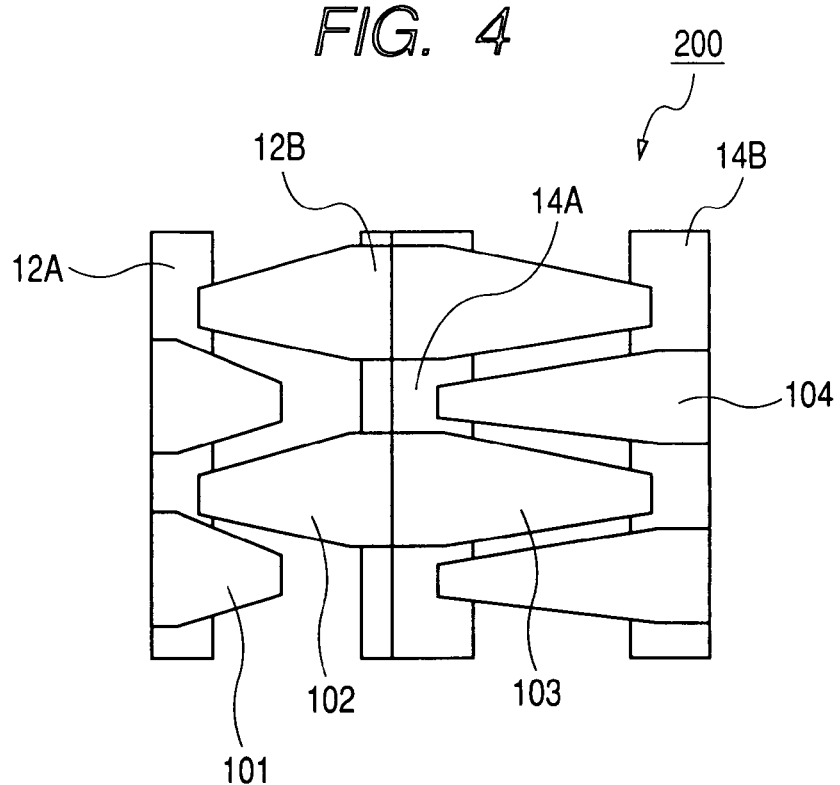
FIG. 4 is a schematic plan view showing field cores of the tandem alternator of FIG. 3.

In comparison, referring to FIGS. 3 and 4, in the alternator 200, both the axial widths of the inside disc portions 12B and 14A are reduced, so that the sum of axial widths of the inside disc portions 12B and 14A is less than that of the outside disc portions 12A and 14B. Further, the sum of axial widths of the inside disc portions 12B and 14A is larger than each of the axial widths of the outside disc portion 12A and 14B.

Such a reduction in the axial widths of the inside disc portions 12B and 14A are made based on the following considerations.

In an automotive tandem alternator, the two power generation units are rarely required to operate concurrently at the respective maximum field currents. Further, it is also possible to control the power generation units to inhibit them from operating concurrently at the respective maximum field currents. In addition, even when the power generation units are required to output the respective maximum powers but inhibited from operating concurrently at the respective maximum field currents, it is still possible to meet the maximum power requirements with the assist of automotive batteries.

As shown in FIG. 3, in the present embodiment, the inside disc portions 12B and 14A abut each other, and thus are magnetically connected to each other, thereby forming a common magnetic path to the first and second power generation units.

Accordingly, it is possible to determine the sum of axial widths of the inside disc portions 12B and 14A based only on the practically maximum resultant of the first and second magnetomotive forces. In other words, it is possible to reduce the sum of axial widths of the inside disc portions 12B and 14A, which represents the width of the common magnetic path to the first and second power generation units.

As a result, through the reduction in the axial widths of the inside disc portions 12B and 14A, the axial length of the alternator 200 is further reduced without decreasing the capability of suppressing magnetic leakage between the power generation units.

In addition, though the inside disc portions 12B and 14A are in intimate contact with each other in the present embodiment, there may be a small axial gap between the inside disc portions 12B and 14A to the extent that those portions 12B and 14A are still magnetically connected to each other.

Third Embodiment

This embodiment illustrates an automotive tandem alternator 300 which has a structure almost identical to that of the alternator 200 according to the second embodiment. Accordingly, only the differences therebetween will be described hereinafter.

Referring again to FIG. 4, in the alternator 200, the inside disc portion 12B of the field core 12 and the inside disc portion 14A of the field core 14 are separately formed. Further, each of the claw portions 102 of the field core 12 extending from the inside disc portion 12B is aligned in the axial direction of the rotary shaft 2 with one of the claw portions 103 of the field core 14 extending from the inside disc portion 14A. In other words, the circumferential position (i.e., the position in the circumferential direction of the rotary shaft 2) of each of the claw portions 102 coincides with that of one of the claw portions 103.

Figure 5:
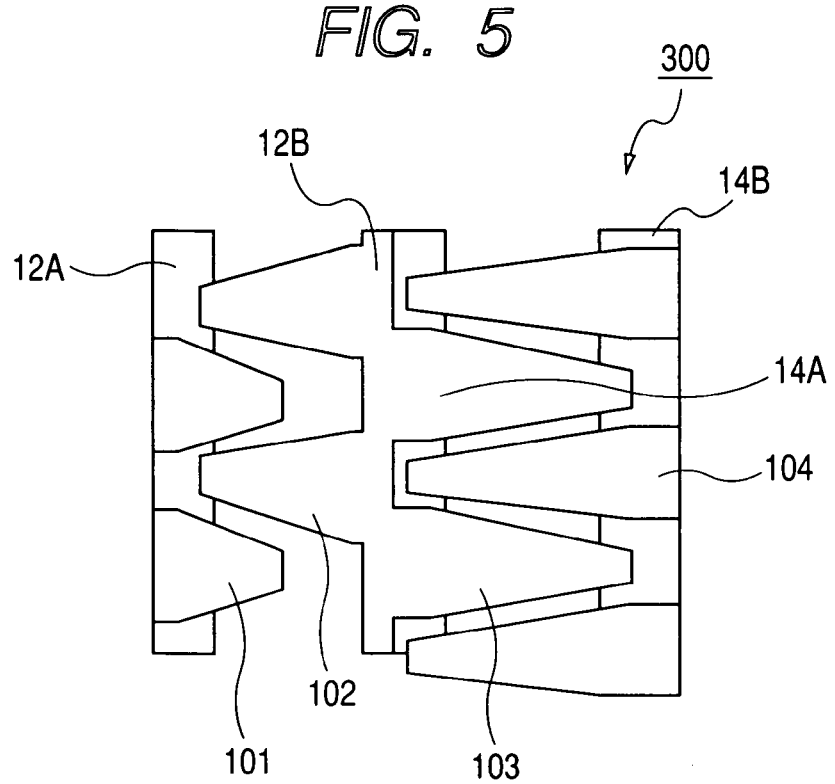
FIG. 5 is a schematic plan view showing field cores of a tandem alternator according to the third embodiment of the invention.
Figure 6:
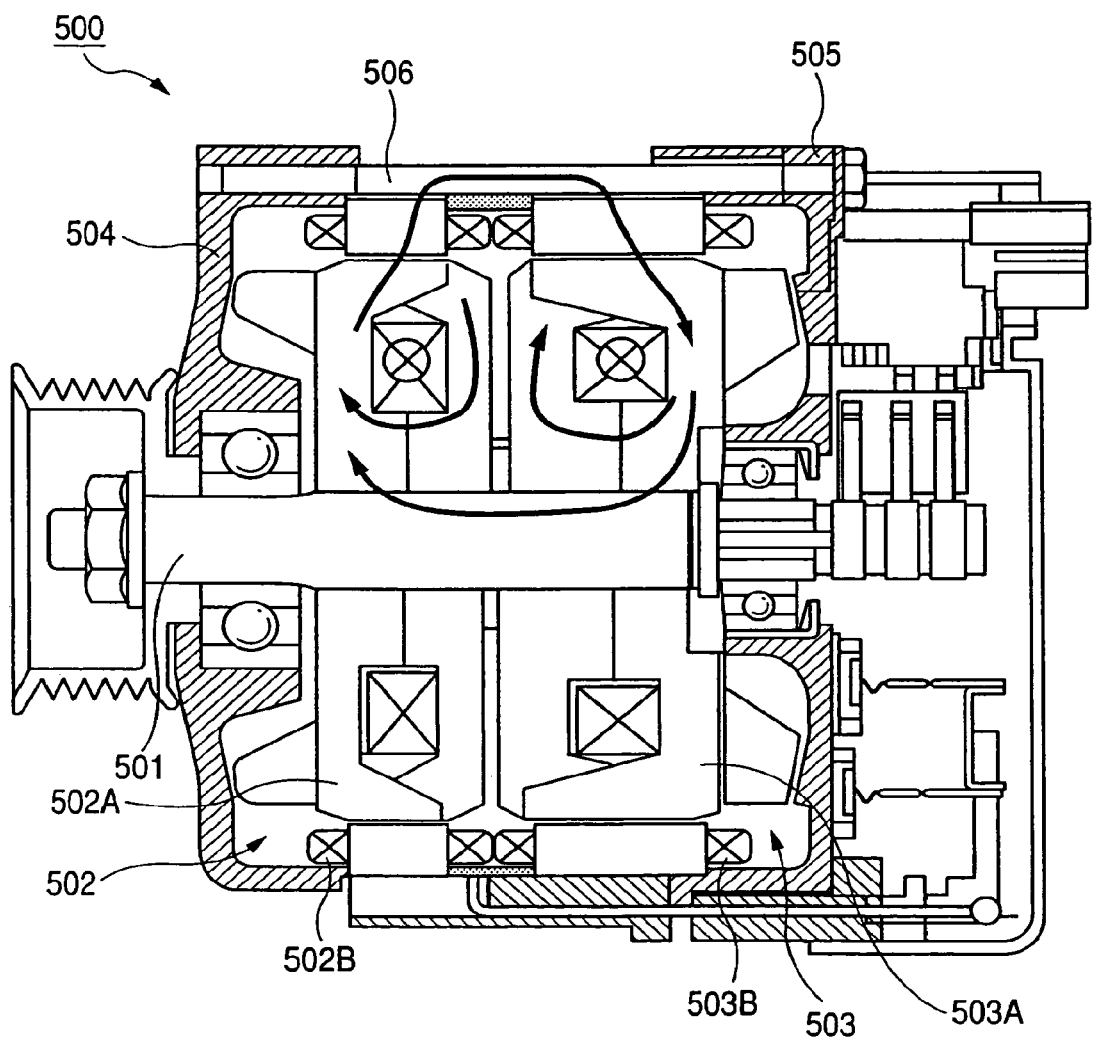
FIG. 6 is a partially cross-sectional side view showing the overall configuration of a conventional tandem alternator.

In comparison, referring to FIG. 5, in the alternator 300, the inside disc portion 12B of the field core 12 and the inside disc portion 14A of the field core 14 are integrally formed. Further, each of the claw portions 102 is interposed in the circumferential direction of the rotary shaft 2 between an adjacent pair of the claw portions 103. In other words, the claw portions 102 and the claw portions 103 are alternately arranged in the circumferential direction of the rotary shaft 2. Furthermore, in the present embodiment, the claw portions 102 and 103 are so arranged that the difference in electrical angle between any circumferentially adjacent pair of claw portion 102 and claw portion 103 is equal to 180 degrees. Accordingly, the difference in electrical angle between any circumferentially adjacent pair of claw portion 101 extending from the outside disc portion 12A and claw portion 104 extending from the outside disc portion 14B is also equal to 180 degrees.

With the above arrangement, it is possible to uniformly distribute the magnetic flux flows from the integrated inside disc portions 12B and 14A to the claw portions 102 and 103 in the circumferential direction of the rotary shaft 2, thereby avoiding any local concentration of magnetic flux.

While the above particular embodiments of the invention have been shown and described, it will be understood by those who practice the invention and those skilled in the art that various modifications, changes, and improvements may be made to the invention without departing from the spirit of the disclosed concept.

Such modifications, changes, and improvements within the skill of the art are intended to be covered by the appended claims.

What is claimed is:

1. A tandem alternator comprising:
a rotary shaft;
a first field and a second field which are arranged in tandem on the rotary shaft; and
a first and a second armature which are arranged in tandem in an axial direction of the rotary shaft, the first armature being provided on an outer periphery of the first field to constitute, together with the first field, a first electric power generation unit, the second armature being provided on an outer periphery of the second field to constitute, together with the second field, a second electric power generation unit,
wherein the first and second fields are arranged to abut each other in the axial direction of the rotary shaft,
the first and second fields are configured to respectively create a first and a second magnetomotive force whose directions are opposite to each other,
the first field includes a first lundell-type field core mounted on the rotary shaft and a first field winding wound around the first field core, and the second field includes a second lundell-type field core mounted on the rotary shaft and a second field winding wound around the second field core,
each of the first and second field cores includes a pair of inside and outside disc portions that are spaced in the axial direction of the rotary shaft with a corresponding one of the first and second field windings interposed therebetween, the inside disc portion of the first field core is integrally formed with the inside disc portion of the second field core, the first and second field cores include the same number of claw portions extending axially outward from the respective inside disc portions, the claw portions extending from the inside disc portion of the first field core are alternately arranged in a circumferential direction of the rotary shaft with the claw portions extending from the inside disc portion of the second field core, and a difference in electrical angle between each circumferentially adjacent pair of one of the claw portions extending from the inside disc portion of the first field core and one of the claw portions extending from the inside disc portion of the second field core is equal to 180 electrical degrees.

2. The tandem alternator as set forth in claim 1, further comprising:

a first housing and a second housing which are arranged in the axial direction of the rotary shaft with the first and second armatures intervening therebetween, the first and second housings rotatably supporting the rotary shaft; and a plurality of connecting members each of which extends in the axial direction of the rotary shaft to connect the first and second housings, thereby securing the first and second armatures between the first and second housings, wherein each of the connecting members is made of a magnetic material.

3. The tandem alternator as set forth in claim 2, wherein the first armature includes a first cylindrical armature core and a first armature winding wound around the first armature core, and the second armature includes a second cylindrical armature core and a second armature winding wound around the second armature core, and wherein each of the first and second armature cores has formed on an outer surface thereof a plurality of recesses extending in the axial direction of the rotary shaft, and each of the connecting members is partially received in a pair of the recesses that are formed respectively on the outer surfaces of the first and second armature cores and aligned in the axial direction of the rotary shaft.

4. The tandem alternator as set forth in claim 2, further comprising a ring which is made of a magnetic material and interposed between the first and second armatures in the axial direction of the rotary shaft.

5. The tandem alternator as set forth in claim 2, wherein each of the connecting members is a bolt.

6. The tandem alternator as set forth in claim 1 wherein the sum of widths of the inside disc portions is less than the sum of widths of the outside disc portions of the first and second field cores in the axial direction of the rotary shaft.

7. The tandem alternator as set forth in claim 1, wherein the rotary shaft is configured to be driven by an engine of an automobile.

* * * * *